July 1, 1958  E. D. BASCH  2,841,104
CHECK WIRE PAY-OUT STAKE
Filed March 18, 1957  3 Sheets-Sheet 1
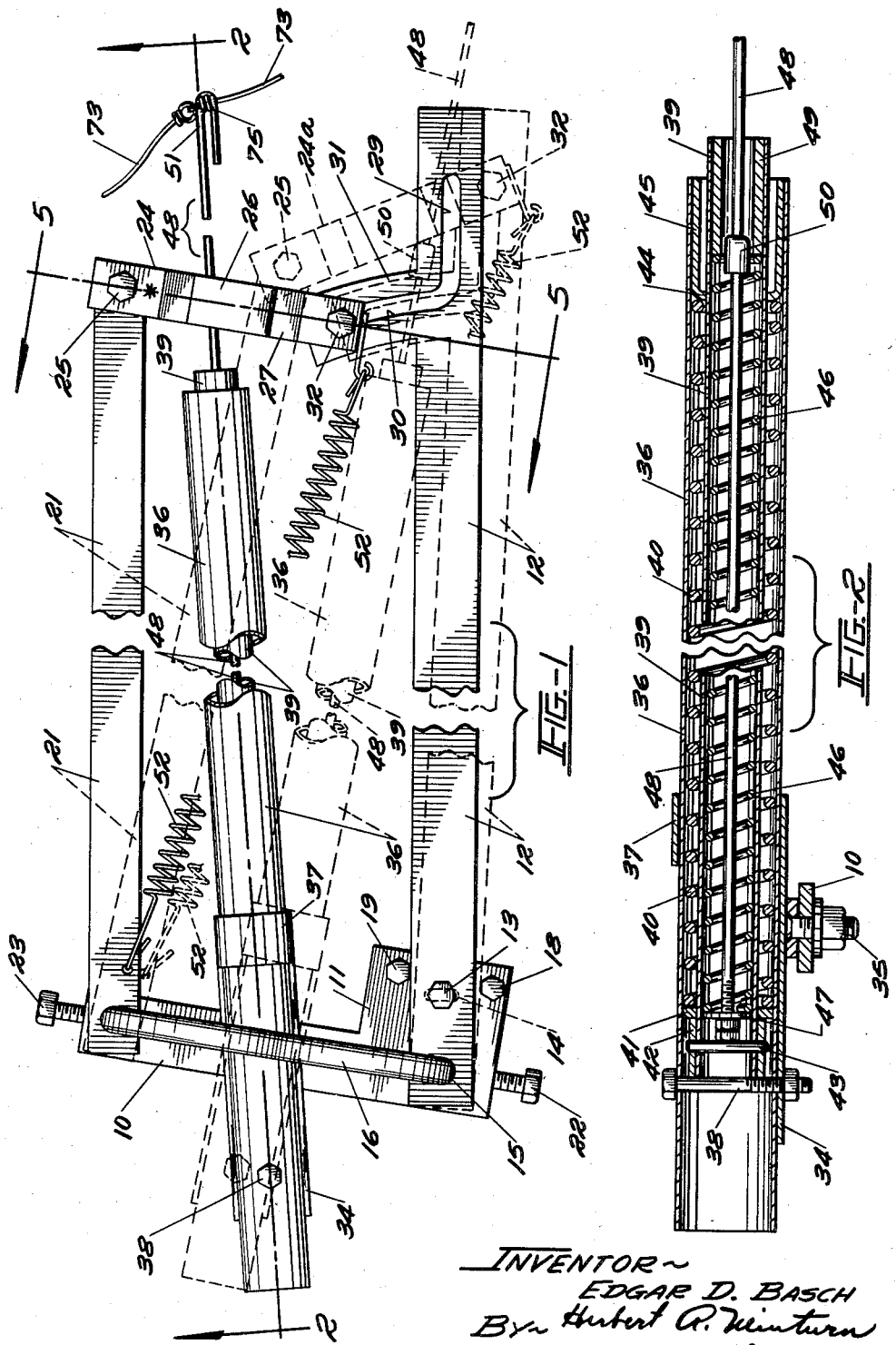
INVENTOR~
EDGAR D. BASCH
By Hubert A. Minturn
ATTORNEY

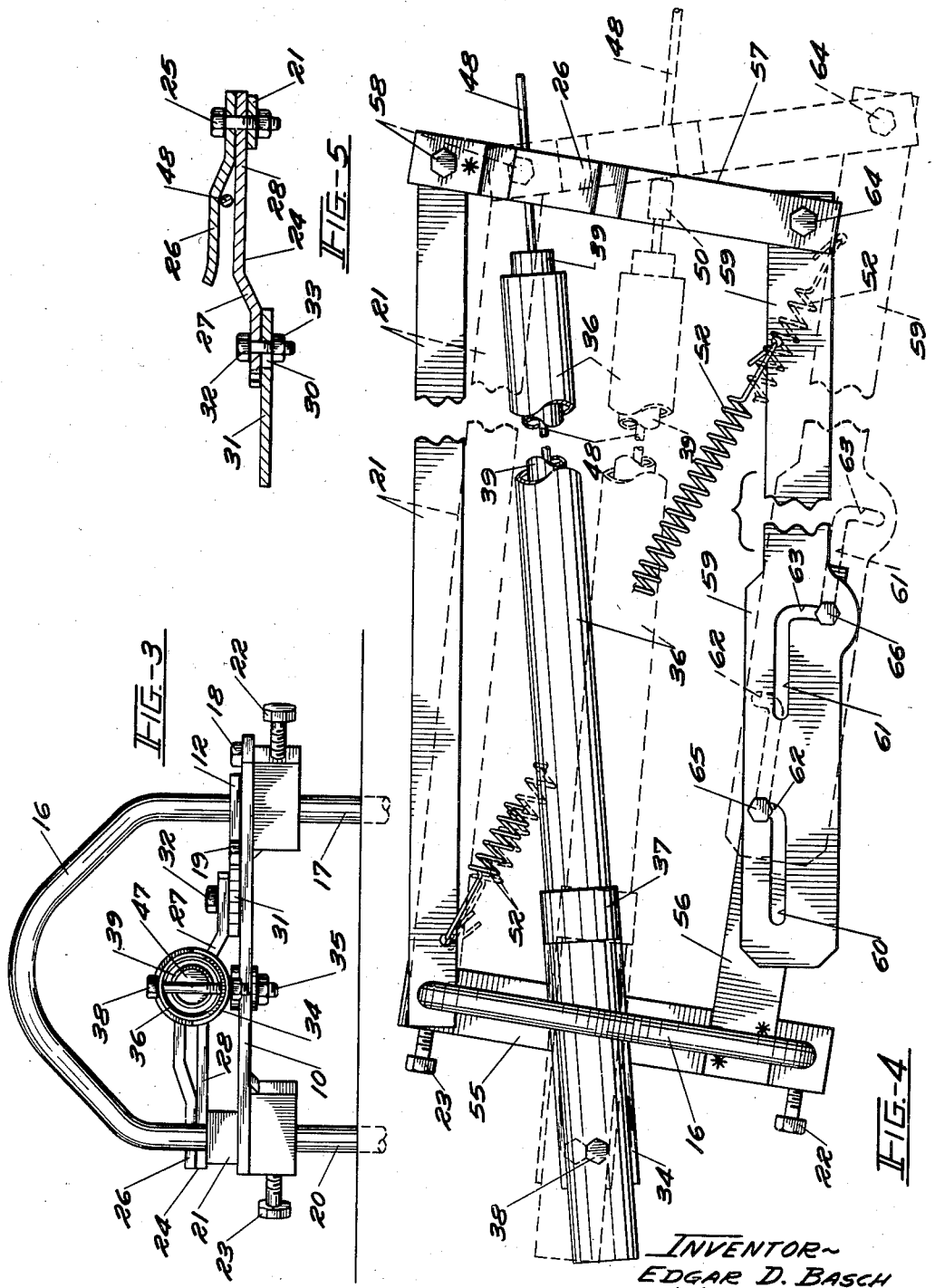

July 1, 1958 E. D. BASCH 2,841,104
CHECK WIRE PAY-OUT STAKE
Filed March 18, 1957 3 Sheets-Sheet 3
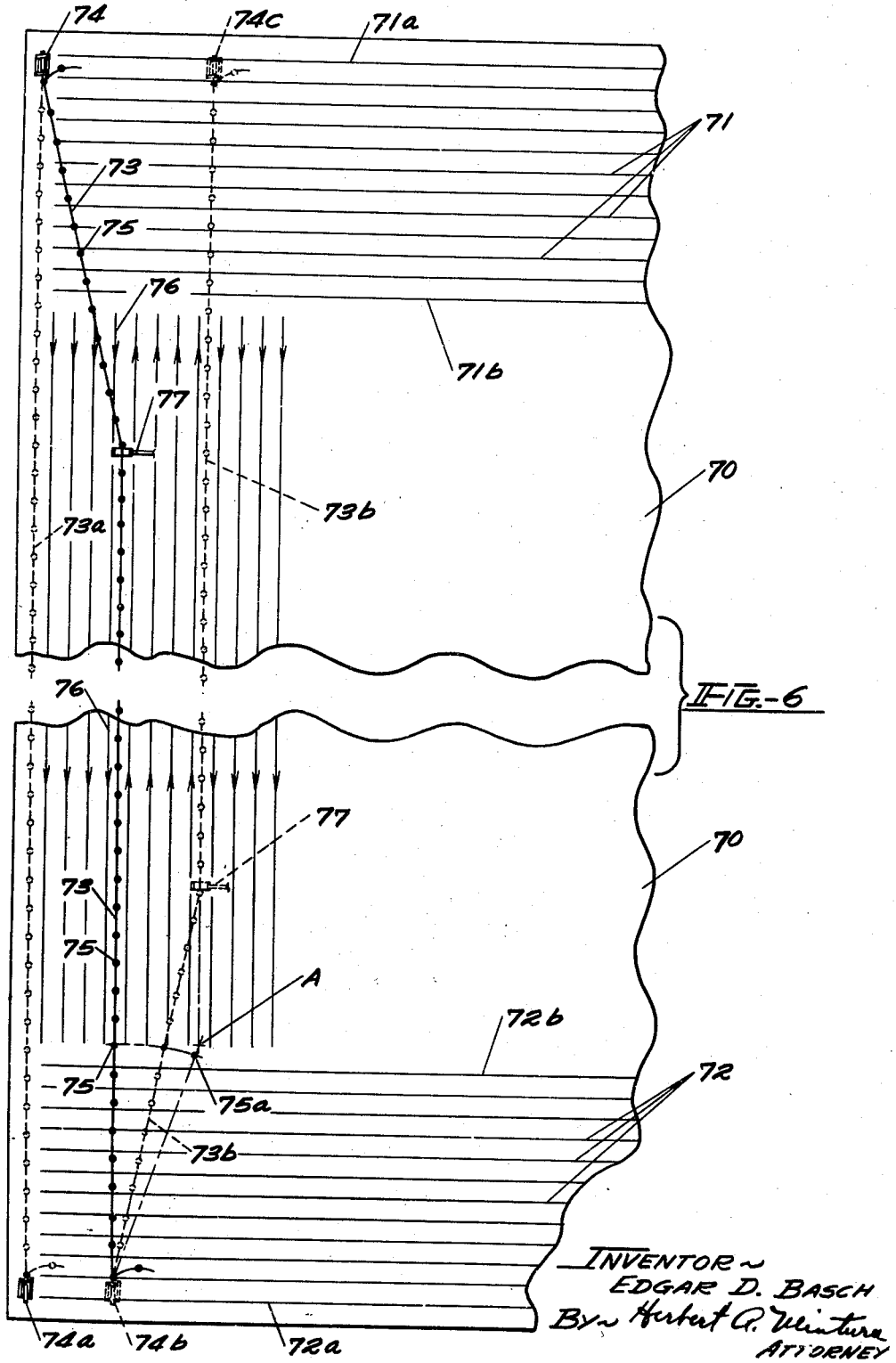

2,841,104
CHECK WIRE PAY-OUT STAKE

Edgar D. Basch, Lyons, Ind.

Application March 18, 1957, Serial No. 646,737

7 Claims. (Cl. 111—49)

This invention relates to a device for paying out a check wire under increasing tension set up in the wire as it is pulled laterally across a field by a corn planter upon approaching its end of travel at the end of the field whereby the planter will be caused to drop the corn to give an accurate cross check at both ends of the field as well as throughout the length thereof.

The invention is particularly well adapted to use in multiple row planting planters, and especially to a four row planter which is now being commonly used. In going from a two row to a four row planter, an increased tension is set up in the check wire over and above what it would be with the two row planter due to the increased width of the four row planter.

A primary purpose of the invention is to promote accuracy of checking by preventing surge of the check wire across the field and by providing for paying out of the wire in response to a predetermined pull on the wire set up by angularity of the wire in approaching ends of planting rows.

A further important object of the invention is to provide a structure of the nature indicated which will be exceedingly simple in construction and quite easily handled in the field without any complicating settings, use of wrenches, or the use of exact measurements in setting the stake. Furthermore, there is incorporated in the fundamental purpose of the invention the uniform acting of the device in accordance with the prevailing conditions encountered in the field.

Further objects and advantages of the invention will be better understood by those versed in the art in the following description of the invention as illustrated in the accompanying drawings, in which Fig. 1 is a view in top plan of a structure embodying the invention;

Fig. 2 is a central vertical longitudinal section on an enlarged scale through the structure on the line 2—2 in Fig. 1;

Fig. 3 is a view in rear elevation;

Fig. 4 is a view in top plan of a slightly modified form of the structure;

Fig. 5 is a view in vertical section on the line 5—5 in Fig. 1; and

Fig. 6 is a view in diagrammatic representation of the invention as applied to a field being planted.

Referring first to Figs. 1–3, a base plate 10 is formed to have an extension 11 to one side and at one end. A major length bar 12 is rockably attached to the extension 11 by means of a cap-screw 13 which extends downwardly through a slot 14 in the extension 11, the bar 12 having a hole 15 therethrough coinciding with a like hole through the extension 11, and through which hole one leg 17 of the stake 16 passes. The bar 12 is limited in its degree of rocking around the leg 17 of the stake 16 by reason of the abutments 18 and 19 carried by the extension 11, one on either side of the bar 12. The abutments are spaced apart a distance greater than the width of the bar 12.

From the other end of the bar 10 and rockably carried around the leg 20 of the stake 16, which leg also passes downwardly through the base member 10, is a shorter length bar 21. The base member 10 is adjustably secured along the legs 17 and 20 by means of set screws 22 and 23.

A release member 24 is rockably attached to the free end of the bar 21 by any suitable means, herein shown as by means of the cap-screw 25. This member 24 has a finger 26 fixed thereto and extending from the end through which the bolt 25 passes, to extend upwardly and thence along a length of the member 24 in spaced relation therefrom as indicated in Fig. 5. The member 24 extends from a length 28 downwardly through the short length 27 and thence continues on in parallel relation to the original length 28 through which the bolt 25 extends.

The major length bar 12 has a slot 29 therethrough in its outer end portion, extending longitudinally of the bar for a distance and thence curving around into a slot portion 30 which extends through a finger 31 projecting from the side of the bar 12 toward the other bar 21. The free end of the member 24 has a bolt 32 extending therethrough and down through the slot portion 30 to receive a nut 33 from the underside of the finger 31.

A saddle 34 is rockably connected to the base member 10 intermediate the stake legs 17 and 20 by any suitable means, herein shown as by means of a bolt 35. A tube 36 is carried by the saddle 34 and fixed thereto by extending through a cylindrical portion 37 of the saddle at the forward end thereof, and by means of a bolt 38 which passes through the tube 36 and the underside portion of the saddle 34.

A tube 39 is carried within the tube 36 in spaced relation therefrom, and a coiled spring 40 is positioned to surround the inner tube 39 within the tube 36 in free sliding manner in relation to both of the tubes. The inner end of the spring 40 bears against a suitable stop carried by the tube 39, herein shown as consisting of a washer 41 encircling the tube 39 in turn bearing against a short tubular length 42 surrounding the tube 39 and fixed thereto by any suitable means, such as by the pin 43. The outer portion of the spring 40 bears against a stop 44 fixed to the tube 36, this stop 44 being herein shown as an inturned end portion of a short length of tube 45 closely telescoping within the end of the tube 36.

A smaller diameter, coil spring 46 is carried within the inner tube 39 to bear by the inner end thereof against a piston like member 47 which is carried on the end of a rod 48, normally being positioned adjacent the pin 43. The rod 48 extends centrally through the spring 46 and on out beyond the free end of the tube 39 which may extend a short distance beyond the corresponding end of the outer tube 36 as indicated in Figs. 1 and 2. This tube 39 carries a stop member 49, herein shown as being a length of tubing telescoping within the tube 39, and against which stop member 49 the outer end of the spring 46 bears. An abutment member 50 is fixed to the rod 48 and initially bears slidingly within the stop member 49 so that the rod 48 may be pulled outwardly from the tube 39 in resistance to the spring 46, and in turn the spring 40 may be compressed by travel of the tube 39 compressing it against the abutment 44. The inner spring 46 is of such diameter of wire and of spacing apart between coils that it will initially compress to some degree before compression of the spring 40 will be had, the spring 40 being of a larger diameter wire and therefore being stiffer. The rod 48 extends normally when the springs 40 and 46 are uncompressed beyond the tube 39 a distance sufficient in extent to carry a hook 51 into which may be engaged the check wire 73 by having the wire itself pass through the hook portion 51 and be stopped by one of the knots or buttons 75 which are spaced along the wire 73 in the usual and well known manner for a check wire.

The rod 48 extends by its free end between the finger portion 26 and the upper portion 28, Fig. 5, being normally positioned toward that end of the spacing between those two portions which is adjacent the bolt 25 as indicated in Figs. 1 and 5. A tension spring 52 is fixed by one end to the member 24 adjacent the bolt 32 and by its other end to the bar 21 adjacent the base member 10, and is under tension to position the various members which have been described in those positions indicated by the solid lines in Fig. 1 wherein the bar 12 is pulled upwardly against the abutment 19; the bolt 32 is carried in the end of the slot portion 30 toward the outer end of the finger 31; and the bar 21 is rocked into substantial parallelism with the bar 12. The saddle 34 remains free to rock on base member 10, since the rod 48 is free to travel across the arm 24.

Referring to Fig. 4, a slightly modified form of the structure is illustrated wherein there is a fixed base plate member 55 through which the stake 16 passes by its legs 17 and 20. Along the bar 55 and adjacent to the stake leg 17 there is fixed an arm 56 to be substantially at right angles to the member 55. A bar 21 is rockably carried around the leg 20 of the stake 16 as in the other form, and a release member 57 is rockably attached to the other end of the bar 21 by any suitable means such as by the cap-screw 58. This member 57 has the upraised finger 26 between which the rod 48 freely passes. The structure as shown in Fig. 2 is rockably mounted on the base plate 55 in the same manner as has been described before.

An arm 59 is rockably attached by one end to the free end of the member 57 and extends toward and over the member 56. This arm 59 is provided with two separate and longitudinally aligned slots 60 and 61 thereto, the slot 60 having one end thereof turned at right angles into the portion 62 toward that side of the arm 59 which is toward the tube 36, and the other slot 61 has an end portion turning at right angles in the opposite direction toward the other edge of the arm 59, this portion being designated by the numeral 63. These portions 62 and 63 are at the ends of the respective slots 60 and 61 which are directed toward the cap-screw 64 which forms a pivot connection between the member 57 and the bar 59. Cap-screws 65 and 66 extend slidingly through the slots 60 and 61 and their end portions 62 and 63, and are fixed in the bar 56 thereunder.

*Operation*

Referring to Fig. 6, a field to be planted is designated by the numeral 70. In the usual practice of setting out to plant corn in a field where the corn is to be checked, transverse rows 71 and 72 will be planted across the ends of the field all in the usual and well known manner. In the use of my invention, and as applied to a four row corn planter, I will plant twelve rows 71 across the one end and twelve rows 72 across the other end.

A check wire 73 will be strung out along one edge of the field initially as indicated by the dash line position 73a. The wire will be secured between the end stakes embodying my invention, designated for the sake of convenience generally as stakes 74 and 74a. Stake 74 will be set substantially on the row 71a adjacent the outer edge of the field at one end of the field, and the stake 74a will be set on the row 72a at the opposite end of the field, the check wire 73 being pulled up into a substantially straight line between those stakes.

The planter (not shown) is driven across the field from the row 71b to the row 72b along the side of the field, the wire being carried through the usual and well known planter valve trip mechanism to cause the corn to drop in accordance with each of the spaced apart "knots" 75 provided on the check wire 73 all in the usual and well known manner. With this initial planting of the first four rows, the planter is turned around in the area over the transverse rows 72, and lined up on the marker row (not shown). The stake 74a is moved to the right as viewed in Fig. 6, and reset in the position 74b where it will be in line approximately midway between the planted row 76 and the spacing to the next row to be planted. The exact positioning of the stake 74a along the row 72a is not critical, but it should approximate the setting as indicated. The wire 73 is then dropped into the check wire head 77, the stake 74 remaining in the position as it was originally set.

Then in moving the planter across the field, the head 77 will travel in a straight line along the wire 73 shown in solid line, tending to pull the wire 73 over from the initial dash line position to the solid line position, that is moving from the position 73a to the position 73 as indicated in Fig. 6, and as will be noted, the wire between the head 77 and the stake 74 assumes an increasing angular displacement from the straight line 73a as the head 77 approaches the transverse planter line 71b.

Before proceeding further, it is to be pointed out that the stake construction which is set along the transverse line 72a is in the position of the various parts as indicated in Figs. 1 and 2, whereas that construction as set along the line 71a is turned upside down to have the tube and its member 24 undermost instead of being on the upper side.

As the angularity of the wire 73 between the head 77 and the stake 74 increases, there will be increasing tension applied on that wire, and unless that tension is relieved, there is going to be inaccuracy in the checking of the corn, that is the dropping of the corn at the required spaced apart locations to permit plowing the corn transversely of the field as well as longitudinally thereof. My invention enters into this situation to provide for a "paying-out" of the wire 73 from the stake 74 without changing the position of the wire 73 between the head 77 and the stake 74b. With this "paying-out," the planter head 77 may be moved on up to the row 71b and the corn will be accurately dropped. The check wire 73 is then released from the head 77, and the planter turned around to make a return trip which will be the third series of four rows to be planted across the field in the longitudinal direction. Upon turning the planter around, the stake 74 is moved over to the position 74c along the transverse line 71a, and the wire then engaged thereto. The wire 73 remains attached to the stake in the position 74b.

As the head 77 of the planter approaches the line 72b, the check wire will be diagonally extended therefrom to the stake at 74b. This again sets up a tension in the wire requiring that the wire be payed out or increased in length from the stake 74b in order to insure the accurate planting as is required adjacent, particularly, to the rows 71b and 72b.

This mode of planting is continued until the field is planted entirely thereacross. In this operation of paying-out the check wire 73 from the stake 74 in each instance, the following action takes place in reference to the form of the invention as illustrated in Figs. 1 and 2. Assuming that the mechanism is fixed on the stake 16 at the position 74b, as the head 77 comes along the check wire in the dash line, shifted position 73b, the length of the wire from the head 77 to the position 74b becomes more angularly displaced to the right hand side of the wire in the position of the solid line, and so doing requires the wire to pay out from the stake 74b. There will be sufficient drag over the field to cause the wire from the head 77 in the dash line position back to the position of the stake at the other end of the field, the position of 74c, to cause that wire to resist being dragged along the field, and there is sufficient hold on the wire at the stake 74c to prevent travel of the wire therefrom.

However at the position 74b, as the angularity of the wire 73 increases, the mechanism held by the stake 16 will rock from the solid line position, Fig. 1, to approach the dash line position, until such inclination of the tube 36 is had whereby the member 24 will be rocked to the position 24a, dash line position, so that the angularity of that member 24 is changed from a slope by its free end toward the plate 10 to a slope away therefrom due to the fact that the cap-screw 32 will travel down the slot portion 30 and thence into the longitudinal slot 29 overcoming the spring pull 52, and when the member 24 reaches the position 24a, the abutment 50 will travel outwardly to come into bearing contact with the member 24, and then start to slide therealong due to its angularity toward the member 12, and finally be released from between the member 24 and finger 26 so that the rod 48 is then restrained from further travel outwardly from the tube 36 by means of the resistance set up by the two springs 40 and 46. In this regard, it is to be noted that the check wire is engaged through the hook 51, in the usual and well known manner, by sliding the check wire through the hook until one of the knots 75 is at the hook to resist further travel of the wire therethrough.

In the beginning of the pull of the wire 73 from the straight line position to the angular position between the head 77 and the stake at the position 74b, the abutment 50 will come out and bear against the release member 24 and the finger 26 thereabove, but normally the pull on the wire is not sufficient to rock the member 24 initially, or at least sufficiently to cause the abutment 50 to slide along the member 24 and finger 26, but as that angularity does increase, the pull on the rod 48 increases, until the member 24 is rocked as above indicated, and the abutment 50 is released from the open end of the space between the member 24 and finger 26. This release is not a sudden jerk, but is very gradual, and as that wire angularity continues to increase, the rod 48 will continue to be pulled outwardly against the increasing resistance of that travel set up by the springs 40 and 46.

In the form of the invention, Figs. 1 and 2, which I am now using, the total resistance to full compression of the springs 40 and 46 will be in the neighborhood of thirty-two pounds, although this may be increased by approximately five pounds if desired. With this thirty-two-pound applied pressure, to fully compress the two springs, the smaller spring 46 will initially require fourteen pounds and the larger spring 40 will require sixteen pounds normally to approach the fully compressed conditions, the extra two pounds being required to fully compress the springs, which compression however is not desirable since there should be left a short travel of the rod 48 in order to prevent a rigid pull being set up on the stake 16.

Thus it is to be seen there is a paying-out of the rod 48 which in reality, being hooked to the wire 73 is a paying-out of the wire 73. This may be best illustrated in referring again to Fig. 6, where the button 75 for example on the wire 73 is swung to that position 75a under the maximum angularity of the wire 73 between the head 77 and the position 74b just at the time the head 77 is raised to release the wire at a point A at the end of the longitudinal trip. It is to be seen that there is a distance left between the knot 75a and the point A. The location of the button 75a would be spaced from the point A a distance which will approximate seventeen inches. This is the amount of pay-out required from the stake at the position 74b in order to keep the buttons 75 along the wire in the position 73b in exact alignment with the buttons in the line of the wire 73 and also in the line of the wire 73a, that is, in those three positions and so on across the field, the buttons 75 must line up transversely across the field in order to permit plowing of the corn in that direction. A slight deviation of course such as a matter of an inch or so is not critical, but is to be avoided it at all possible.

This amount of pay-out between the point 75a and the point A is provided by means of compressing the springs automatically in the device, so that the rod 48, traveling with the wire 73 in each instance will start paying-out when the angularity reaches such a point that the tension in the wire will start compressing those springs 40 and 46. As has been noted above, the springs not only serve to increasingly resist the pay-out, but also by reason of the fact that there are the two springs each of different loading characteristics, the pay-out is permitted to be faster as long as the spring 46 is operating in the absence of any movement of the spring 40, although that condition does not exist for any appreciable length of time.

The operation in any event as provided by the mechanism constituting the present invention is exceedingly smooth and without a jerk or release when the rod 48 is no longer restrained by the abutment 50 bearing against the member 24 and its finger 26. It is to be noted that the bar 10 is angularly positioned in reference to the bars 12 and 21 when in their normal, "non-loaded" positions as indicated in Fig. 1. This inclination of the member 10 to the bar 12 is approximately eight degrees. Accordingly the stake 16 is not set to have its two legs 17 and 20 in exact alignment with a transverse planter line across the field, but is set at substantially this eight degree position. While it has been indicated that the pay-out in the one particular instance for following the twelve row planting across the ends of the field is around seventeen inches, that pay-out may be varied by varying the lengths of the springs 40 and 46, and the corresponding lengths of the tubes 36 and 39. In the present instance, these springs uncompressed are approximately twenty-four and one-half inches long to give some idea of the proportions of the various elements entering into the device.

The structure embodying the invention as shown in Fig. 4 is fundamentally the same, using substantially the same plate 10, bar 21, a release member 57 rockably attached to the end of the bar 21, and interengaged with the member 59 and the related member 56, these two members 56 and 59 taking the place of the bar 12.

In this modified form of Fig. 4, when the abutment 50 strikes the release member 57 and the finger 26 thereover, the pressure thereagainst tends to rock the member 57 and pull the member 59 in a direction away from the plate 55 which takes the place of the former plate 10. It is to be noted that in the initial positioning of the members 56 and 59, they are not in straight alignment one with the other, but are at an obtuse angle as indicated in Fig. 4 where slidably retaining members 65 and 66 are at the extreme ends of the transverse slot portions 62 and 63. The initial pull of the spring 52 tends to preserve that relationship. However this spring 52 is readily overcome by pressure of the stop 50 on the member 57, permitting the member 57 to tend to straighten the alignment of the members 56 and 59 whereby the member 59 will rock on the pivot member 65 to pull the slot portion 63 downwardly and thus bring the slot 61 into alignment with the member 66 and in so doing, the plate portion 59 will rock on the upper side of the slot 61 in relation to the plate 56 to bring the slot 60 into alignment with the member 65 and thus release the prohibition to travel of the member 57 outwardly in relation to the base member 55, this initial outward travel being the length of the slots 60 and 61 as the limitation thereof. By the time the slots 60 and 61 have travelled along the members 65 and 66, the angularity of the member 57 will be as indicated by the dash lines, such as will permit the abutment 50 to slide along the edges of the member 57 and the finger 26 until it reaches the end of the finger 26 whereby the abutment 50 will be released, and the rod 48 may then be pulled on farther away from the tube 36 for the pay out of the check wire. The internal construction within the tube 36 is exactly as has been described above.

Therefore while I have provided an exceedingly simple yet most effective structure for the purposes intended, it is obvious that structural changes may be made without departing from the spirit of the invention, and I therefore do not desire to be limited to the precise forms herein shown and described beyond the limitations which may be imposed by the following claims.

I claim:
1. In a corn planter check wire pay-out mechanism operating under increasing tension set up in the wire, the combination of a base member; stake means interengaging said member and having a pair of legs entering the ground retaining said member against rotation about said means; a pair of bars rockably carried by said member and extending in a common direction therefrom; a release member rockably carried by one of said bars; said other bar having a slot therethrough in part longitudinally thereof and in part laterally thereof; a pivot member carried by said release member and slidingly entering said slot; spring means interengaging the release member and said one bar normally rocking the release member toward said base member positioning the release member at an acute angle with said one bar limited in degree by the limits of travel of the pivot member in said slot; a tubular housing swingably carried by said base member between said two bars and extending therebetween; a tube freely extending within said housing; a compression spring within said tube; an abutment in an outer end portion of the tube; a check wire engaging rod entering said tube within said spring; an abutment on the rod; said spring lying between said two abutments; a second compression spring within said housing surrounding said tube; a spring abutment carried by an outer end portion of the housing past which said tube may slide; a spring abutment externally of the tube, between which two spring abutments said second spring lies; said first spring requiring less pressure to compress it than said second spring; said rod passing across said release member; and an abutment on said rod striking said release member upon pull on said rod by said wire, said abutment sliding along and becoming free of the release member upon increasing pull on said rod, thereby setting up a "pay-out" of the rod dependent upon the degree of pull thereof by said wire.

2. The structure of claim 1 in which there is means limiting rocking of the second bar in relation to said base member, and there is an arm extending laterally from the second bar along which the lateral part of said slot extends.

3. A structure automatically paying out a corn planter check wire from a fixed stake position under increasing angular line of pull as the planter approaches the end of a planted row to one side of the stake: which structure comprises a base member; a stake member entering the ground, engaging and maintaining the base member in fixed position; a bar rockably carried by and extending from a pivot on the base member; a release member rockably carried by a pivot on said bar remotely located from the base member; bar means carried by said base member and extending to and rockably engaging release member by a pivot spaced from the release member-to-first-bar pivot; an abutment carried by said bar means; a spring interengaging said release bar and said first bar normally rocking said release member to be stopped by said abutment to an acute angle with said first bar; said bar means having slot means permitting said second release bar pivot to travel with the release member against opposition of said spring to a release member obtuse angle position with said first bar; a resisting spring; a carrier holding said resisting spring and rockably carried by said base member; a rod connecting said resisting spring and extending across said release member for engagement by an end portion with said check wire; and an abutment on said rod bearing against the release member upon a predetermined pull on the rod; said rod abutment rocking said release bar from said obtuse angle upon increasing pull on the rod overcoming the opposition of said first spring while increasingly loading the resisting spring; said rod abutment sliding from engagement with the release member as it approaches said obtuse angle position allowing said resisting spring to carry the full load from said rod pull and permitting said release member to return to its acute angle position.

4. The structure of claim 3 in which said slot means comprises a longitudinal slot along said bar means, from which slot leads a slot laterally therefrom, and in which lateral slot said release member-second pivot enters in said acute angle position, the lateral slot constituting said bar means abutment.

5. The structure of claim 3 in which said bar means comprises a pair of bars one of which, through said bar means pivot, rockably engages said release by one end portion, and by the other end portion overlaps the other bar of said pair, said slot means comprising a slot longitudinally extending along one of said pair of bars and the other of the pair having a pin member entering and sliding in said slot, said other bar of the pair being fixed to said base member; said one bar of the pair being extended from the other upon said release member being rocked from its acute to its obtuse angle.

6. The structure of claim 5 in which said slot means includes a slot extending laterally of said longitudinal slot in which lateral slot said pin member is received upon rocking of said one bar to hold said one bar of the pair against extension from the other with the release member in its acute angle position.

7. The structure of claim 6 in which said slot means includes a second longitudinal slot in said one bar of the pair and a pin entering the second slot from and carried by the other bar of the pair, said last pin serving as a fulcrum during said one bar rocking and extension from the other bar of the pair.

References Cited in the file of this patent

UNITED STATES PATENTS

| | | |
|---|---|---|
| 1,258,360 | Petersen | Mar. 5, 1918 |
| 2,612,042 | Clarke | Sept. 30, 1952 |